United States Patent Office 3,161,217
Patented Dec. 15, 1964

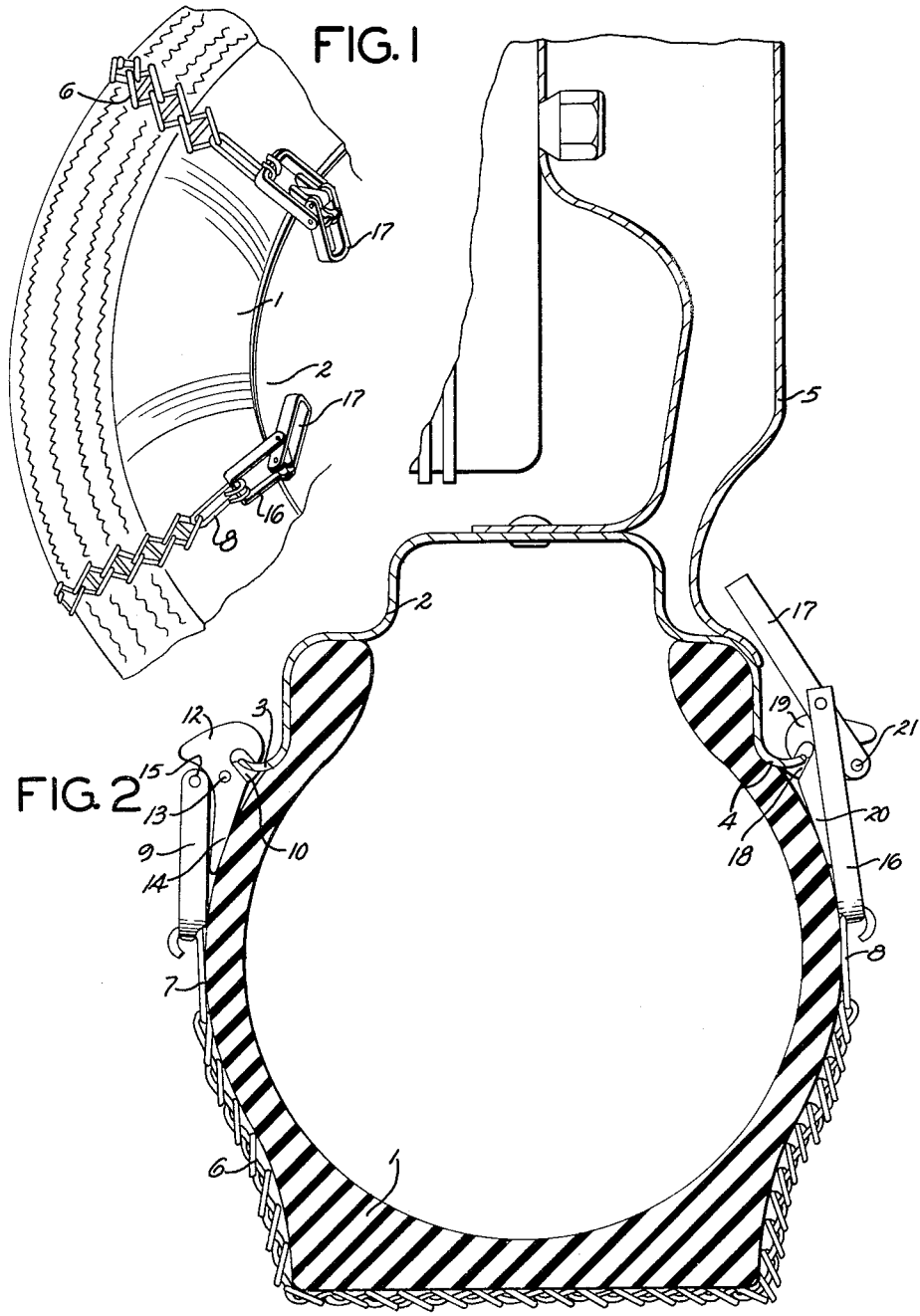

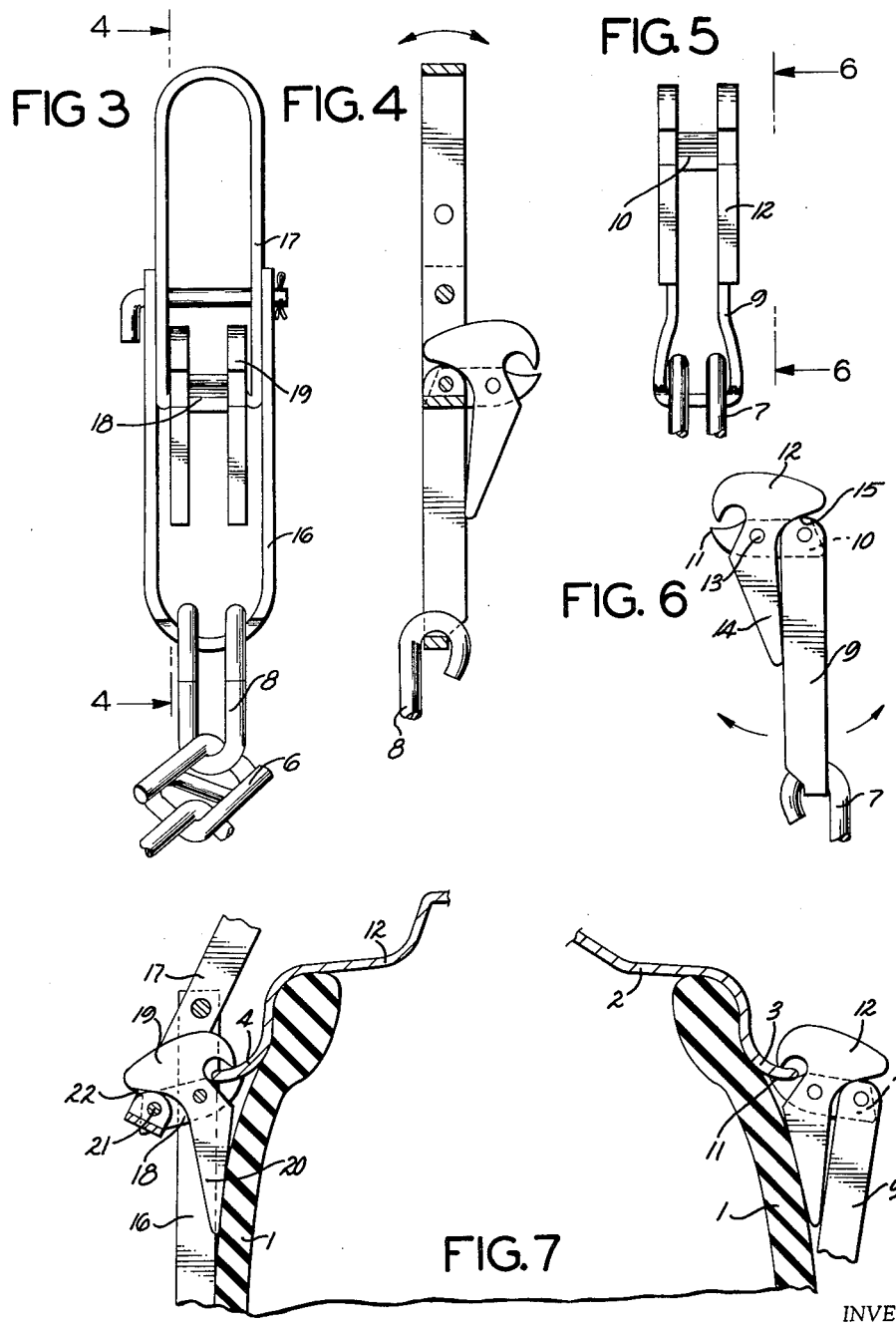

3,161,217
EMERGENCY TIRE CHAIN
Eldrick D. Chartier, 1405 Harper St., Santa Cruz, Calif.
Filed May 13, 1963, Ser. No. 279,902
4 Claims. (Cl. 152—236)

This invention relates to an emergency tire chain which can be removably secured to the rim of a vehicle wheel, so that the chain portion of the device may extend around the tread of the tire.

An object of my invention is to provide a novel emergency tire chain which can be quickly and easily attached to the edges of the rim of the vehicle tire, and without requiring any part of the tire chain to pass through the vehicle wheel, that is, the tire chain does not completely encircle the tire but extends over the tread portion thereof, and the ends are detachably secured to both sides of the rim of the vehicle wheel.

Another object of my invention is to provide a novel emergency tire chain of the character stated in which an effective gripping means is provided to removably engage and grip the rim of the wheel.

Still another object of my invention is to provide a novel emergency tire chain with a latching structure on the tire gripping ends of the chain which will remain locked onto the vehicle rim until the latch is manually released.

A feature of my invention resides in the adaptability of the emergency tire chain to the modern vehicle wheel in which there are no spokes or openings in the wheel through which any part of a tire chain might extend; my tire chain being mountable on the vehicle tire without the requirement of entirely encircling the tire.

Other objects, advantages and features of invention may appear from the accompanying drawings, the subjoined detailed description and the appended claims.

In the drawing:

FIGURE 1 is a fragmentary perspective view of a vehicle tire and wheel with my emergency tire chains mounted thereon.

FIGURE 2 is a fragmentary transverse sectional view of a vehicle tire and rim with my tire chain mounted thereon.

FIGURE 3 is a front elevation of the rim gripping device for the outside of the rim.

FIGURE 4 is a sectional view taken on line 4—4 of FIGURE 3.

FIGURE 5 is a front elevation of the rim engaging device for the inside of the rim.

FIGURE 6 is a side elevation as viewed from the line 6—6 of FIGURE 5.

FIGURE 7 is a fragmentary transverse sectional view of my tire chain mounted on a tire.

Referring more particularly to the drawing, the numeral 1 indicates the usual vehicle tire which is mounted on a metal rim 2 of usual and well known construction. The rim 2 is formed with outwardly curved peripheral edges 3 and 4, of which the edge 3 is on the inside of the tire and the edge 4 is on the outside of the tire. A wheel cover 5 is usually mounted on the outside of the wheel 2, and it will be noted that in my construction it will not be necessary to remove the wheel cover while using the tire chains.

The tire chain 6 partly encircles the tire 1 and extends across the tread portion of the tire. A hook link 7 is provided on the inner end of the chain 6, and a similar hook link 8 is provided on the outer end of the chain 6. The hook 7 hooks over one end of a U-shaped link 9. The link 9 serves as the latching member, as will be subsequently described. A dog 10 is pivotally mounted on the upper end of the link 9 and this dog is provided with a sharp tooth 11 to engage the edge 3 of the rim 2.

A jaw 12 cooperates with the dog 10 and is pivotally mounted on the dog, as shown at 13. The jaw 12 is provided with depending fingers 14 which extend parallel to the link 9 and are engaged by this link when the latch mechanism is closed. A cam surface 15 is formed on the upper end of the link 9 and this cam surface engages the jaw 12 to swing that jaw on its pivot 13 and press the jaw against the edge 3 of the rim, and at the same time to press the dog 10 against the edge 3 of the rim, thus securely clamping the rim between the jaw 12 and the dog 10. The fingers 14 also lie against the side of the tire 1, as shown in FIGURE 2.

At the outer end of the chain 6 I provide a rim gripping device as follows: The hook link 8 of the chain hooks over the outer end of a U-shaped coupling 16. At the upper end of the coupling 16 a link 17 is pivotally mounted and this link serves as a final latching and tightening mechanism for the tire chain. A dog 18 is pivotally attached to the coupling 16 and this dog is formed with a pointed end which engages the rolled edge 4 of the rim 2. A bifurcated jaw 19 cooperates with the dog 18 to grip and clamp the edge of the rim 2 to thus hold the tire chain in position. A finger 20 on the jaw 19 rests against the side of the tire 1 when the tire chain is in position. The end of the link 17 is also pivotally attached to the dog 18, as shown at 21, and a cam surface 22 on the link engages the jaw 19 to cam this jaw into engagement with the rim 2, and also to swing the dog 18 into engagement with the rim so that the rim is thus securely gripped between the dog 18 and the jaw 19.

In operation:

The inner end of the chain 6 is first attached to the inner rolled edge 3 of the rim 2 by placing the dog 10 and the jaw 12 on opposite sides of the edge 3. The link 9 is now swung inwardly against the face of the tire 1 and the cam surface 15 will swing the sharp teeth of the dog and jaw against the edge 3, thus firmly gripping the rim. The chan 6 is now pulled around the tread face of the tire and the jaw 19 and dog 18 are placed on opposite sides of the edge 4 of the rim 2, and with their sharp tooth portions engaging the rim. The link 17 is now swung towards the rim 2 which tightens the chain 6, and also moves the cam surface 22 against the jaw 19 to thus pinch the jaw and the dog 18 towards each other to thereby grip the rolled edge 4 of the rim 2. The emergency chain 6 is thus securely held around the tread of the tire 1 and manual release of the link 17 is required before the chain can be removed.

Having described my invention, I claim:

1. An emergency tire chain for a vehicle tire mounted on a wheel rim, comprising
   a length of chain extending across the tread of the tire,
   fastening means on both ends of said chain, including
      a dog and a jaw pivotally attached to the dog, said dog and jaw each having a tooth thereon engaging the rim of the wheel,
   a link pivotally attached to the dog and engageable with the jaw to press said dog and jaw against the rim.

2. An emergency tire chain for a vehicle tire mounted on a wheel rim, comprising
   a length of chain extending across the tread of the tire,
   fastening means on both ends of said chain, including
      a dog and a jaw pivotally attached to the dog,
      said dog and jaw each having a tooth thereon engaging the rim of the wheel,
   a link pivotally attached to the dog and engageable with the jaw to press said dog and jaw against the rim,
   a finger extending from the jaw, said finger bearing against the side of the tire in one position of the parts.

3. An emergency tire chain for a vehicle tire mounted on a wheel rim, comprising
a length of chain extending across the tread of the tire,
fastening means on both ends of said chain, including
one of said fastening means including a dog and a jaw pivotally attached to the dog, said dog and jaw each having a tooth thereon engaging the rim of the wheel,
a link pivotally attached to the dog and engageable with the jaw to press said dog and jaw against the rim,
the other fastening means including
a dog and a jaw pivotally attached to the dog,
said dog and jaw each having a tooth thereon engaging the rim of the wheel,
a link pivotally attached to the dog and engageable with the jaw to press said dog and jaw against the rim,
and a coupling pivotally attached to the dog,
said chain engaging the end of the coupling opposite said pivotal attachment.

4. An emergency tire chain for a vehicle tire mounted on a wheel rim, comprising
a length of chain extending across the tread of the tire,
fastening means on both ends of said chain, including
one of said fastening means including a dog and a jaw pivotally attached to the dog, said dog and jaw each having a tooth thereon engaging the rim of the wheel,
a link pivotally attached to the dog and engageable with the jaw to press said dog and jaw against the rim,
the other fasteinng means including
a dog and a jaw pivotally attached to the dog,
said dog and jaw each having a tooth thereon engaging the rim of the wheel,
a link pivotally attached to the dog and engageable with the jaw to press said dog and jaw against the rim,
a coupling pivotally attached to the dog,
said chain engaging the end of the coupling opposite said pivotal attachment,
and a finger on each of said jaws, said fingers resting against the side of the tire in one position of the parts.

References Cited by the Examiner
UNITED STATES PATENTS

| | | | |
|---|---|---|---|
| 736,170 | 8/03 | Stuver | 24—250 |
| 2,840,132 | 6/58 | Palmer et al. | 152—236 XR |
| 2,925,844 | 2/60 | Matthews | 152—236 |

ARTHUR L. LA POINT, *Primary Examiner.*